United States Patent
Takeda et al.

(10) Patent No.: US 7,790,214 B2
(45) Date of Patent: Sep. 7, 2010

(54) METHOD OF INHIBITING 2,3-BUTANEDIONE FORMATION FROM PROCESSED CACAO BEAN PRODUCT

(75) Inventors: Keiko Takeda, Okayama (JP); Sae Murai, Okayama (JP); Kazuyuki Oku, Okayama (JP); Michio Kubota, Okayama (JP); Shigeharu Fukuda, Okayama (JP)

(73) Assignee: Kabushiki Kaisha Hayashibara Seibutsu Kagaku Kenkyujo, Okayama (JP)

( * ) Notice: Subject to any disclaimer, the term of this patent is extended or adjusted under 35 U.S.C. 154(b) by 1000 days.

(21) Appl. No.: 11/578,336

(22) PCT Filed: Apr. 11, 2005

(86) PCT No.: PCT/JP2005/007020

§ 371 (c)(1),
(2), (4) Date: Oct. 12, 2006

(87) PCT Pub. No.: WO2005/099472

PCT Pub. Date: Oct. 27, 2005

(65) Prior Publication Data

US 2007/0207253 A1    Sep. 6, 2007

(30) Foreign Application Priority Data

Apr. 12, 2004    (JP) .............................. 2004-116710

(51) Int. Cl.
    *A23L 1/36* (2006.01)
(52) U.S. Cl. ........................................ 426/631; 426/629
(58) Field of Classification Search ................. 426/631
    See application file for complete search history.

(56) References Cited

FOREIGN PATENT DOCUMENTS

| JP | 2000-290683 | * | 9/1999 |
| JP | 11-346656 | * | 12/1999 |
| JP | EP0983727 | * | 8/2000 |

OTHER PUBLICATIONS

Ghizzoni, C. 1995. Composition of volatile fraction of industiral Chocolate. Italian Food Beverage Technology, March issue, p. 3.*

* cited by examiner

*Primary Examiner*—Carolyn A Paden
(74) *Attorney, Agent, or Firm*—Browdy and Neimark, PLLC

(57) ABSTRACT

The present invention has objects to provide a method of inhibiting the 2,3-butanedione formation in order to produce a satisfactorily flavorful processed cacao bean product and an agent for inhibiting the 2,3-butanedione formation which is used for the method, and solves the above objects by providing a method of inhibiting the 2,3-butanedione formation during the process and/or preservation, and an agent for inhibiting the 2,3-butanedione formation which comprises one or more members selected from the group consisting of maltitol, α,α-trehalose and saccharide derivatives of α,α-trehalose as effective ingredients.

8 Claims, No Drawings

METHOD OF INHIBITING 2,3-BUTANEDIONE FORMATION FROM PROCESSED CACAO BEAN PRODUCT

TECHNICAL FIELD

The present invention relates to a method of inhibiting the 2,3-butanedione formation from processed cacao bean products, and an agent for inhibiting the 2,3-butanedione formation to be used for the method, particularly, to a method of inhibiting the 2,3-butanedione formation and an agent for inhibiting the 2,3-butanedione formation to be used for the method that is applicable when a chocolate or cocoa powder is produced from cocoa butter, chocolate cake or cocoa powder, as a row material, prepared from cacao nib or cacao mass processed from cacao bean, when a processed food such as a confectionery, bread and beverage containing the above chocolate or cocoa powder is produced, or when a chocolate, cocoa powder or processed food containing the same is preserved.

BACKGROUND ART

When a chocolate and cocoa powder are processed from cacao nib or cacao mass, or cocoa powder, chocolate cake or cocoa butter prepared therefrom, or when chocolate confectionery, ganache, baked goods including cakes, bread or beverage containing cocoa powder or chocolate is produced therefrom, a foreign odor called stuffy smell or butter's smell generates and decreases a flavor characteristic to these processed products. A main causative substance of the above foreign odor is 2,3-butanedione (referring to Teranishi et al., "Flavor Chemistry: 30 years of progress", pp. 147-153, published by Kluwer Academic/Plenum Publisher, New York, in 1999). It is known that 2,3-butanedione exhibits a strong foreign odor even at an extremely low concentration, and is one of the causative substance of deteriorating foods or beverages (referring to "Chemistry and Physiology of Flavor", pp. 203-204, published by Kenpakusha Inc., in 1977).

While, Japanese Patent Publication Kokai No.123194/2001 discloses a method of inhibiting the formation of aldehydes as causative substances of a foreign odor generating during roasting and steaming by incorporating maltitol or trehalose in processed seed products such as cacao beans. α,α-Trehalose, saccharide derivatives of α,α-trehalose or saccharide compositions containing them disclosed in Japanese Patent Publication Kokai No.143876/95 and maltitol disclosed in Japanese Patent Publication Kokai No. 2439/85 can be used for imparting a sweetness and an improved taste into chocolates. However, the above literatures do not describe and suggest about any effective inhibition of the 2,3-butanedione formation as a causative substance for stuffy smell generating during process or preservation of processed cacao bean products for the purpose of producing satisfactorily flavorful processed cacao bean products.

The present invention has the first object to provide a method of inhibiting the 2,3-butanedione formation in order to produce a satisfactorily flavorful processed cacao bean products. The present invention has the second object to provide an agent for inhibiting the 2,3-butanedione formation, which is used for the method.

DISCLOSURE OF THE INVENTION

The present inventors have eagerly studied the use of saccharides to attain the above objects. As a result, they unexpectedly revealed that a saccharide selected from the group consisting of maltitol. α,α-trehalose and saccharide derivatives of α,α-trehalose effectively inhibits the 2,3-butanedione formation as a causative substance for stuffy smell during processing and/or preserving processed cacao bean products. Further, they unexpectedly revealed that such saccharides scarcely or hardly inhibit the isobutanal formation as an aromatic substance of processed cacao bean product (referring to "*Italian Food and Beverage Technology*", Vol. 3, pp. 3-13, published in 1995). They confirmed that the method of inhibiting the 2,3-butanedione formation from a processed cacao bean product by adding one or more members selected from the group consisting of maltitol, α,α-trehalose and saccharide derivatives of a,o-trehalose to the processed cacao bean product during processing. Further, they confirmed that the agent for inhibiting 2,3-butanedione formation, which comprises one or more members selected from the group consisting of maltitol, a,a-trehalose and saccharide derivatives of α,α-trehalose as an effective ingredient, and it is used for the method, and thus they accomplish the present invention.

The present invention enables to produce or preserve a flavorful processed cacao bean product by providing a method of effectively inhibiting the formation of 2,3-butanedione as a causative substance of stuffy smell as scarcely or hardly inhibiting the formation of isobutanal as an aromatic substance during processing and/or preserving, and an agent for inhibiting the 2,3-butanedione formation which comprises one or more members selected from the group consisting of maltitol, α,α-trehalose and saccharide derivatives of α,α-trehalose as an effective ingredient(s).

BEST MODE FOR CARRYING OUT THE INVENTION

Maltitol can be used in the present invention independently of its origin, property and process as long as it inhibits the 2,3-butanedione formation during the process or preservation of cacao bean and/or processed cacao bean product. Examples of maltitol used in the present invention are a syrup or powder containing maltitol produced by hydrogenating starch hydrolyzate containing maltose; and a syrup, syrup containing crystal or crystalline anhydrate of maltitol produced by the method disclosed in Japanese Patent No.13699/72 or No.2439/88. Concretely, various hydrogenated starch hydrolyzates, maltitol syrup, maltitol powder or crystalline maltitol are advantageously used.

α,α-Trehalose can be used in the present invention independently of its origin, property, and process as long as it inhibits the 2,3-butanedione formation during process or preservation of cacao bean and/or processed cacao bean produced by using its ingredient. A commercialized trehalose (for example, product name "TREHA", an α,α-trehalose commercialized by Hayashibara Shoji, Inc.) can be arbitrarily used in the present invention. Trehalose can also be produced by the method disclosed in Japanese Patent Publication Kokai No.213283/95. α,α-Trehalose in a syrup, powder, anhydrous crystalline, or hydrous crystalline form can be advantageously used. Unfortunately, α,α-trehalose has a stronger effect on inhibiting the formation of lower aldehydes including isobutanal as an flavor ingredient of processed cacao beans in comparison with saccharide derivatives of α,α-trehalose. However, α,α-trehalose is satisfactorily effective on inhibiting the retrogradation of starch and the oxidation of lipid. Therefore, α,α-trehalose can be advantageously used for processed products produced by using ingredients of cacao bean together with powders of grains, lipids or pulps, which is illustrated with custard cream, cake or cookie used with cocoa powder or chocolate or chocolate mixed with fruits, because it inhibits the generation of stuffy smell due to 2,3-butanedione from the foods and beverages containing chocolates as well as the retrogradation of starch and the deterioration of lipid. In addition, α,α-trehalose can improve flavors of the products until the products are provided as a meal because α,α-trehalose preserves flavor and taste of pulps.

Any saccharide derivative of α,α-trehalose can be used in the present invention as long as it inhibits the 2,3-butanedione formation during process or preservation of processed cacao bean products produced by using cacao beans and/or ingredients thereof. Saccharide derivatives of α,α-trehalose, which are in the form of a syrup, amorphous powder, syrup containing crystal powder, or crystal, can be advantageously used. Saccharide derivatives of α,α-trehalose are non-reducing oligosaccharides consisting of three or more glucose residues and having the α,α-trehalose structure in the molecule. Concretely explaining, they have a form that any one of mono-glucose residue, di-glucose residue, tri-glucose residue and tetra-glucose residue binds to at least one glucose residue of α,α-trehalose. The same applicant discloses some examples of such saccharides in Japanese Patent publication Kokai No.143876/95. Saccharide derivatives of α,α-trehalose with a glucose polymerization degree of three to six are preferably used in the present invention, which are illustrated with mono-glucosyl α,α-trehaloses such as α-glucosyl α,α-trehalose (alias α-maltosyl α-glucoside) and α-isomaltosyl α-glucoside; di-glucosyl α,α-trehaloses such as α-maltosyl α,α-trehalose (alias α-maltotriosyl α-glucoside), α-maltosyl α-maltoside, α-isomaltosyl α-maltoside, α-isomaltosyl α-isomaltoside; tri-glucosyl α,α-trehaloses such as α-maltotoriosyl α,α-trehalose (alias α-maltotetraosyl α-glucoside), α-maltosyl α-maltotrioside and α-panosyl α-maltoside; tetra-glucosyl α,α-trehaloses such as α-maltotetraosyl α,α-trehalose (alias α-pentaosyl α-glucoside), α-maltotriosyl α-maltotrioside and α-panosyl α-maltotrioside.

The above saccharide derivatives of α,α-trehalose can be used independently of its origin and process. They can be fermentationally, enzymatically or organic-synthetically produced. For example, the saccharides can be directly produced from starch or partial hydrolyzate thereof by the enzymatic method disclosed by the same applicant in Japanese Patent Publication Kokai No.143876/95. In addition, the saccharides can be produced by reacting non-reducing saccharide forming enzyme disclosed in Japanese Patent Publication Kokai No. 143876/95 to partial starch hydrolyzate highly containing specific oligosaccharides such as maltotetraose, maltopentaose, maltohexaose and maltoheptaose, which are produced by using α-amylase capable of efficiently producing maltotetraose disclosed in Japanese Patent Publication Kokai No.143876/95, α-amylase capable of efficiently producing maltopentaose disclosed in Japanese Patent No.14962/95, α-amylase capable of producing maltohexaose and maltoheptaose disclosed in Japanese Patent Publication Kokai No.236478/95. They also can be produced by allowing an enzyme having a glycosyl-transferring activity such as cyclodextrin glucanotransferase to act on a solution containing α,α-trehalose and starch or partial hydrolyzate thereof. The resulting reaction solution can be used optionally after purified partially or highly. They can be subjected to hydrogenation in order to convert reducing saccharides co-existing due to their production process into corresponding sugar alcohols. These production methods are advantageous in view of industrial utility because they enable to efficiently produce saccharide derivatives of α,α-trehalose at a relatively low cost. A commercialized saccharide syrup containing saccharide derivatives of α,α-trehalose according to the methods in the following examples (product name "HALLODEX", commercialized by Hayashibara Shoji, Inc.) can be advantageously used.

Among the above saccharide derivatives of α,α-trehalose, particularly, saccharides having the trehalose structure at the end of molecule such as α-glycosyl α,α-trehalose, α-maltosyl α,α-trehalose, α-maltotriosyl α,α-trehalose and α-maltotetraosyl α,α-trehalose have stronger effect on inhibiting the 2,3-butanedione formation and they are advantageously used in the present invention. As an example of such saccharides, a saccharide composition containing α-maltosyl α,α-trehalose as a main ingredient and one or more members selected from the group consisting of α-glucosyl α,α-trehalose, α-maltotriosyl α,α-trehalose and α-glycosyl α,α-trehalose, disclosed in Japanese Patent Publication Kokai No. 143876/95, is preferably used. Amount of α-maltosyl α,α-trehalose in such a saccharide composition is about 5% by weight (hereinafter, "% by weight" is simply represented by "%" in the present specification) or more, preferably about 10% or more, more preferably about 30% or more, on a dry solid basis. A saccharide composition containing α-maltosyl α,α-trehalose as a saccharide derivative of α,α-trehalose in an amount of about 50% or more, on a dry solid basis, is most preferable because it has a satisfactory effect on inhibiting the 2,3-butanedione formation from processed cacao bean products.

Maltitol, α,α-trehalose and saccharide derivatives of α,α-trehalose are not necessarily restricted to a highly-purified product as long as they do exert the desired effect on inhibiting the 2,3-butanedione formation from processed cacao bean products. If necessary, they can be freely used in combination with one or more members selected from the group consisting of other saccharides acceptable for chocolates or processed foods with chocolates, which are illustrated with reducing saccharides such as glucose, fructose, paratinose, invert sugar, isomerized sugar, maltose, maltotriose, maltotetraose and maltopentaose; non-reducing saccharides such as erythritol, sorbitol, xylitol, reduced paratinose, lactitol, maltotriitol, maltotetraitol, maltopentaitol, α,β-trehalose, β,β-trehalose and cyclic tetrasaccharide; cyclodextrins such as α-cyclodextrin, β-cyclodextrin, γ-cyclodextrin, and derivatives thereof; water-soluble polysaccharides such as gum Arabic, pullulan and ersinan; emulsifiers; and perfumeries.

The term "stuffy smell" as referred to as in the present invention means a foreign odor generating during process or preservation of processed cacao bean products produced by using cacao beans and/or ingredients thereof, and it concretely means an unpleasant smell due to 2,3-butanedione. 2,3-Butanedione is a main substance of foreign odor represented by "butter smell" characteristic to fermented foods (referring to "*Chemistry and Physiology of Flavors*", pp.203-204, published by Kenpakusha Inc., in 1977) and is reported to be a substance affecting living bodies when breathed therein constantly.

The term "ingredient of cacao bean" as referred to as in the present invention means a substance produced from cacao bean as a row material, which is illustrated with cacao ingredients including cacao nib, cacao mass, cacao butter, cacao cake or cacao powder.

The term "processed cacao bean products" as referred to as in the present invention means any product produced from cacao beans and/or ingredients thereof as a row material. Examples of such products are cacao mass, cocoa butter, cacao cake, cocoa powder and processed cocoa powder, chocolate, quasi-chocolate, chocolate confectioneries, quasi-chocolate confectioneries (may be called "chocolates" as a generic name in the present specification), and foods and beverages produced from such chocolates as a raw material (may be called "chocolates-use foods and beverages" in the present specification). It also includes pharmaceuticals, quasi-drugs, cosmetics, luxury foods, commodities or groceries taken orally or used in the mouth or on the skin, which are produced by using chocolates for the purpose of coating or imparting taste or flavor, and are illustrated with tablets, powders, syrups, liquids, teeth pastes, mouth washes, cigarettes, soaps or detergents.

Examples of the chocolates-use foods and beverages are chocolates such as a chocolate dough, quasi-chocolate dough, sweet chocolate (bitter chocolate), milk chocolate and chocolate for coating; cocoa powder; cocoa butter; raw chocolate such as ganache; chocolate bar; white chocolate; sugar coated chocolate; shell chocolate; enrober chocolate; cakes such as sponge cakes or pan cakes including gateau chocolat; confectioneries and bread such as cookie, biscuit, cracker, waffle, dclair, pie, doughnut, pretzel, chocolate snack, pastries including tart, rice confectionery, bread, candy, caramel, jelly, nougat, moose, pudding, bavarois, frozen desert including ice cream, water-confectioneries and manju (bun with bean-jam filling); coated products produced by partially or completely coating or filling such confectioneries, breads or nuts with chocolate; beverage containing chocolate such as cocoa milk drink, cocoa drink, malt beverage, hot chocolate and chocolate drink; chocolate spread; cocoa syrup; chocolate syrup; cocoa paste; chocolate flour paste; chocolate icing; and sauce or whip cream containing chocolates.

For the method of inhibiting the 2,3-butanedione formation from processed cacao bean product of the present invention, maltitol, α,α-trehalose and saccharide derivatives of α,α-trehalose can be used as effective ingredients for the product alone or in combination with two or more of them. Any form such as a syrup, masquitte, paste, powder, solid, granule and tablet, which contains one or more of these saccharides, can be used alone. If necessary, they can freely used after formed into various shape such as a granule, sphere, rod, plate, cube and tablet by mixing with fillers, excipients, binders, emulsifiers, perfumeries and pigments.

The method of inhibiting the 2,3-butanedione formation from processed cacao bean product exerts the desired effect by incorporating one or more members selected from the group consisting of maltitol, α,α-trehalose and saccharide derivatives of α,α-trehalose as effective ingredients in an objective processed cacao bean product. Therefore, in order to perform the method of inhibiting the 2,3-butanedione formation from processed cacao bean product of the present invention, one or more members selected from the group consisting of maltitol, α,α-trehalose and saccharide derivatives of α,α-trehalose as effective ingredients can be arbitrarily incorporated in the processed cacao bean product at any processing step up to obtain a final product (including the step of using raw materials) and/or in the final product in consideration of the composition and application of the objective processed cacao bean products. When incorporated in the product, the saccharides can be premixed together or separately admixed with the product. If necessary, the saccharides can be incorporated in the product at different steps. One or more methods can be freely chosen from incorporating methods such as mixing, kneading, resolving, melting, dispersing, suspending, emulsifying, penetrating, crystallizing, scattering, applying, adhering, spraying, coating, injecting, immersing and solidifying.

The amount of one or more members selected from the group consisting of maltitol, α,α-trehalose and saccharide derivatives of α,α-trehalose for admixing with processed cacao bean product is not specifically restricted as long as the saccharides inhibit the 2,3-butanedione formation derived from an ingredient of cacao bean in the product. If necessary, one or more members selected from the group consisting of maltitol, α,α-trehalose and saccharide derivatives of α,α-trehalose can be partially or wholly replaced with other saccharides used for usually producing processed cacao bean product, and can be used in a larger amount as long as the function, property or application of an objective processed cacao bean product is not affected. For example, the amount of one or more members selected from the group consisting of maltitol, α,α-trehalose and saccharide derivatives of α,α-trehalose is about 0.1% or more, preferably about 1% or more, more preferably about 10% or more to a total amount of cacao bean and/or ingredients thereof in the processed cacao bean product, on dry solid basis. Usually, in the case of less than 0.001%, they are not expected to exert the desired effect on inhibiting the 2,3-butanedione formation from cacao bean and/or ingredients thereof. Upper limit of the amount of one or more members selected from the group consisting of maltitol, α,α-trehalose and saccharide derivatives of α,α-trehalose is not specifically restricted as long as the functions, properties or intended uses are not affected.

The following experiments explain the present invention in more detail.

EXPERIMENT 1

Influence of Saccharides on Inhibiting the 2,3-butanedione Formation from Cocoa Powder 2,3-Butanedione is known as one of causative substances of a stuffy smell from processed cacao bean product. While, lower aldehydes such as isobutanal is known as a characteristic sweet flavor called chocolate flavor. In order to examine the influence of maltitol, α,α-trehalose or saccharide derivatives of α,α-trehalose on the 2,3-butanedione and isobutanal formations during the heat-processing, the following experiment was carried out: any one of anhydrous crystalline maltitol (product name "MABIT", commercialized by Hayashibara Shoji, Inc.), hydrous crystalline α,α-trehalose (product name "TREHAN", commercialized by Hayashibara Shoji, Inc.), sucrose, commercialized enzyme-treated starch syrup, and syrupy saccharide composition containing saccharide derivatives of α,α-trehalose produced according to the following method was weighed to be placed in a 20-ml volume vial by 100 mg on a dry solid base and dissolved in distilled water to prepare 4 g of saccharide solution and admixed with 1 g of a commercialized cocoa powder. The vial was sealed with a rapping film and heated for 18 seconds by microwave (500 W). As a control, a sample was prepared by admixed 1 g of cocoa powder with 4 g of distilled water and treated in the same manner to the saccharide solution. The resulting vial was further sealed with butyl gum cap over the rapping film and heated at 100° C. on a heating block for five minutes. Two milliliters of the resulting headspace gas was subjected to a gas chromatography to measure the amount of 2,3-butanedione and isobutanal. The method of measuring the amount of 2,3-butanedione and isobutanal was carried out as follow.

Method of Measuring the Amount of 2,3-butanedione and isobutanal

Measuring the amount of 2,3-butanedione and isobutanal was carried out by subjecting 2 ml of the headspace gas obtained above to a "Shimazu GC-14B", a gas chromatography commercialized by Shimazu Corporation (hydrogen flame ionizing detector) equipped with "TC-FFAP Capillary Column" (0.52 mmID×30 m, df=1 μm, sprit rate 1/30, commercialized by GL Science Corporation) under the condition of flowing with helium gas (1 ml/min) as a carrier gas and heating the column from 40 to 250° C. (5° C./min).

Inhibitory rate of the 2,3-butanedione or isobutanal formation (%) of each saccharide sample was obtained by comparing that of each sample with that of control defined as 100 to calculate relative value and reducing the relative value 10 from 100. The result is shown in Table 1.

TABLE 1

| | Saccharide | | | | |
|---|---|---|---|---|---|
| Substance | Sucrose | Enzyme-treated starch syrup | maltitol | α,α-trehalose | Syrupy saccharide composition containing saccharide derivatives of α,α-trehalose |
| Inhibitory rate of the 2,3-butanedione formation (%) | 95 | 91 | 100 | 100 | 100 |
| inhibitory rate of the isobutanal formation (%) | 52 | 22 | 13 | 58 | 23 |

As the result shown in Table 1, maltitol, α,α-trehalose, or saccharide composition containing saccharide derivatives of α,α-trehalose completely inhibited the 2,3-butanedione formation when admixed with cocoa powder in the amount of 10% on a dry solid basis to the cocoa powder, in contrast, enzyme-treated starch syrup or sucrose did not. The enzyme-treated starch syrup was the worst effective on inhibiting the 2,3-butanedione formation among six saccharides as test samples. While, α,α-trehalose or sucrose inhibited 50% or more the isobutanal formation when admixed with cocoa powder in the amount of 10% on a dry solid basis. In contrast, enzyme-treated starch syrup, saccharide composition containing saccharide derivatives of α,α-trehalose did not show so strong inhibiting effect. In a panel test using the heated samples, all nine panels judged that α,α-trehalose, maltitol or saccharide composition containing saccharide derivatives of α,α-trehalose was preferable in view of flavor of cocoa. In consideration of such difference among three saccharides from the result the test, because α,α-trehalose more strongly inhibited the isobutanal formation as an aromatic substance of cocoa than maltitol or saccharide composition containing saccharide derivatives of α,α-trehalose under this test condition, maltitol or saccharide composition containing saccharide derivatives of α,α-trehalose was judged to be more preferable. The saccharide composition contains about 41.9% on a dry solid basis of reducing saccharides, which are the same ingredients contained in the commercialized enzyme-treated starch syrup. From the result shown in Table 1, the commercialized enzyme-treated starch syrup had a weak 2,3-butanedione formation action. Therefore, such strong action of the saccharide composition was revealed to be due to the saccharide derivatives of α,α-trehalose.

EXPERIMENT 2

Influence of Saccharides on Inhibiting Stuffy Smell from Custard Cream Using Cocoa Powder Following experiment was carried out in order to examine the influence of saccharides on inhibiting stuffy smell from custard cream using cocoa powder. In detail, custard creams with Brix 45 were produced in a usual manner according to the Formula described in Table 2. The resulting creams were subjected to panel test by 12 panels in order to evaluate their flavors. Sucrose, commercialized enzyme-treated starch syrup, anhydrous crystalline maltitol, hydrous crystalline α,α-trehalose and saccharide syrup containing saccharide derivatives of α,α-trehalose used in the experiment were the same ones used in the Experiment 1. These saccharides were added to the custard creams in an equal amount on a dry solid basis. Judgment criterions of the panel test mean as follows; no inhibitory effect (−): panels judge the creams to have a stick smell without cocoa flavor; effective (+): panels judge the creams to have no stuffy smell with preferable cocoa flavor; strongly effective (++): panels judge the creams to strongly have no stuffy smell with preferable cocoa flavor. The result is shown in Table 2. Ten or more of 12 panels similarly judged for each custard cream.

TABLE 2

| | Formula 1 | Formula 2 | Formula 3 | Formula 4 |
|---|---|---|---|---|
| Yolk | 45 | 45 | 45 | 45 |
| Whole egg | 12.5 | 12.5 | 12.5 | 12.5 |
| Sucrose | 76 | 76 | 76 | 76 |
| Enzyme-treated starch syrup | 101 | 0 | 0 | 0 |
| Anhydrous crystalline maltitol | 0 | 76 | 0 | 0 |
| Hydrous crystalline α,α-trehalose | 0 | 0 | 84 | 0 |
| Syrupy saccharide composition containing saccharide derivatives of α,α-trehalose | 0 | 0 | 0 | 106 |
| Weak flour | 7.5 | 7.5 | 7.5 | 7.5 |
| Corn starch | 22.5 | 22.5 | 22.5 | 22.5 |
| Cocoa powder | 15 | 15 | 15 | 15 |
| Milk | 220 | 220 | 220 | 220 |
| Margarine | 12.5 | 12.5 | 12.5 | 12.5 |
| Effect on inhibiting stuffy smell | − | + | ++ | + |

As the result shown in Table 2, custard cream using sucrose and enzyme-treated starch syrup as saccharides (Formula 1) was judged to have a stick smell without cocoa flavor. In contrast, custard cream using maltitol (Formula 2), α,α-trehalose (Formula 3) or saccharide composition containing saccharide derivatives of α,α-trehalose (Formula 4) instead of enzyme-treated starch syrup in Formula 1 was judged to have reduced stick smell with preferable cocoa flavor. Among the custard creams of Formulae 2-4, custard cream using α,α-trehalose (Formula 3) was judged to have most preferably cocoa flavor. Amount of commercialized enzyme-treated starch syrup, anhydrous crystalline maltitol, hydrous crystalline α,α-trehalose, or syrupy saccharide composition containing saccharide derivatives of α,α-trehalose to cocoa powder is estimated at about 50.6% on a dry solid basis. Without showing concrete data, in view of total taste of custard cream, custard cream using α,α-trehalose (Formula 3)

was judged to be most tasteful and custard cream using saccharide derivatives of α,α-trehalose (Formula 4) was judged to be more tasteful and have more strong sweetness of sugar.

The results shown in Experiments 1 and 2 revealed that maltitol, α,α-trehalose and saccharide derivatives of α,α-trehalose effectively inhibited the 2,3-butanedione formation from processed cacao bean product and were useful for reducing stuffy smell due to 2,3-butanedione from cocoa powder, chocolates having the same ingredient to cocoa powder or processed cacao bean products produced from cacao bean or ingredient of cacao bean.

PRODUCTION EXAMPLE

Producing Saccharide Composition Containing Saccharide Derivatives of α,α-trehalose A corn starch was prepared into an about 20% of starch suspension, admixed with calcium carbonate to give a final concentration of 0.1%, and adjusted to pH 6.5. The resulting solution was admixed with 0.2%/g-starch on a dry solid basis of an α-amylase ("TERMAMYL 60L", commercialized by NovoZyme A/S) and followed by the enzyme reaction at 95° C. for 15 minutes. After autoclaved at 120° C. for 10 minutes, the resulting reaction mixture was cooled to 50° C., adjusted to pH 5.8, admixed with 5 units/g-starch of maltotetraose-forming amylase disclosed in Japanese Patent Publication Kokai No. 240784/88 (commercialized by Hayashibara Biochemical Laboratories Inc.), and 500 units/g-starch of isoamylase (commercialized by Hayashibara Biochemical Laboratories Inc.), and followed by the enzymatic reaction for 48 hours. The reaction mixture was further admixed with 30 units/g-starch of α-amylase ("α-AMYLASE 2A", commercialized by Ueda Chemical Industries Co., Ltd.) and followed by the enzyme reaction at 65° C. for four hours. After autoclaved at 120° C. for 10 minutes, the reaction mixture was cooled to 45° C., admixed with 2 units/g-starch of a non-reducing saccharide-forming enzyme originated from *Arthxrobacter* sp. Q36 (FREM BP-4316), disclosed in Japanese Patent Publication Kokai No. 143876/95, and followed by an enzymatic reaction for 48 hours. The reaction mixture was kept at 95° C. for 10 minute, cooled and filtered to obtain a filtrate. According to conventional manner, the resulting filtrate was decolored with activated charcoal, desalted and purified with ion exchangers in H— and OH— forms, and concentrated into 72.8% syrup in a yield of about 90% to the material starch on a dry solid basis in order to obtain transparent and colorless syrupy saccharide composition containing saccharide derivatives of α,α-trehalose at pH5.3 having slightly sweetness. The syrup showed DE 13.7 and contained 52.5% of α-maltosyl α,α-trehalose (alias α-maltotriosyl α-glucoside), 4.1% of α-glucosyl α,α-trehalose (alias α-maltosyl α-glucoside), 1.1% of α-maltotriosyl α,α-trehalose (alias α-maltotetraosyl α-glucoside), and 0.4% of other α-glycosyl α,α-trehaloses, on a dry solid basis, as saccharide-derivatives of α,α-trehalose. The product contained 2.1% of monosaccharides including glucose, 8.9% of disaccharides including maltose as reducing saccharides, 6.7% of trisaccharides excluding α-glucosyl α,α-trehalose, 17.6% of tetrasaccharides excluding α-maltosyl α,α-trehalose, 6.6% of pentasaccharides or larger excluding α-glycosyl α,α-trehalose on a dry solid basis as reducing saccharides. The product is used as an agent for inhibiting the 2,3-butanedione formation alone or after converted into a powder form by spray-drying.

The following examples explain the present invention in detail. The present invention is not restricted by the examples.

EXAMPLE 1

Chocolate

| | |
|---|---|
| Cacao mass | 40 parts by weight |
| Sugar | 10 parts by weight |
| Anhydrous crystalline maltitol (product name "MABIT", commercialized by Hayashibara Shoji Inc. | 40 parts by weight |
| Cocoa butter | 10 parts by weight |
| Lecithin | 0.3 part by weight |
| Vanillin | 0.03 part by weight |

A chocolate was produced according to the above Formula in a usual manner. The product is flavorful without stuffy smell because maltitol in the product inhibits the 2,3-butanedione formation due to heating cacao bean ingredients. It kept the flavorful condition without stuffy smell just after processed, even when it was tasted after preserved at ambient temperature for six months.

EXAMPLE 2

Chocolate

| | |
|---|---|
| Cacao mass | 12 parts by weight |
| Sugar | 40 parts by weight |
| Hydrous crystalline α,α-trehalose (product name "TREHA", commercialized by Hayashibara Shoji Inc.) | 1 part by weight |
| Whole milk powder | 22 parts by weight |
| Skimmed milk | 3 parts by weight |
| Cocoa butter | 22 parts by weight |
| Lecithin | 0.3 part by weight |
| Vanillin | 0.05 part by weight |

A chocolate was produced according to the above Formula in a usual manner. The product is flavorful without stuffy smell because α,α-trehalose in the product inhibits the 2,3-butanedione formation due to heating ingredients of cacao bean.

EXAMPLE 3

Chocolate

| | |
|---|---|
| Cacao mass | 12 parts by weight |
| Sugar | 40 parts by weight |
| Hydrous crystalline α,α-trehalose (product name "TREHA", commercialized by Hayashibara Shoji Inc.) | 1 part by weight |
| Whole milk powder | 22 parts by weight |
| Skimmed milk | 3 parts by weight |
| Cocoa butter | 22 parts by weight |
| Lecithin | 0.3 part by weight |
| Vanillin | 0.05 part by weight |

A chocolate was produced according to the above Formula in a usual manner. The product is flavorful without stuffy smell because α,α-trehalose in the product inhibits the 2,3-butanedione formation due to heating ingredients of cacao bean.

EXAMPLE 4

Chocolate

| | |
|---|---|
| Cacao mass | 19 parts by weight |
| Anhydrous crystalline maltitol (product name "MABIT", commercialized by Hayashibara Shoji Inc.) | 40 parts by weight |
| Hydrous crystalline α,α-trehalose (product name "TREHA", commercialized by Hayashibara Shoji Inc.) | 4 part by weight |
| Whole milk powder | 14 parts by weight |
| Skimed milk | 2.5 parts by weight |
| Cocoa butter | 8 parts by weight |
| Hardened oil | 12.5 parts by weight |
| Lecithin | 0.3 part by weight |
| Vanillin | 0.07 part by weight |

A chocolate was produced according to the above Formula in a usual manner. The product is flavorful without stuffy smell because maltitol and α,α-trehalose in the product inhibit the 2,3-butanedione formation due to heating ingredients of cacao bean.

EXAMPLE 5

Chocolate

| | |
|---|---|
| Cacao mass | 20 parts by weight |
| Sugar | 36 parts by weight |
| Anhydrous crystalline maltitol (product name "MABIT", commercialized by Hayashibara Shoji Inc.) | 11 parts by weight |
| Whole milk powder | 11 parts by weight |
| Cocoa butter | 22 parts by weight |
| Lecithin | 0.3 part by weight |
| Emulsifying agent (product name "RYOTO Sugar Ester ER-290", commercialized by Mitsubishi Chemical Foods Corporation) | 0.2 part by weight |
| Perfumeries | An appropriate amount |

A chocolate was produced according to the above Formula in a usual manner. The product is flavorful without stuffy smell because maltitol in the product inhibits the 2,3-butanedione formation due to heating ingredients of cacao bean. It kept the flavorful condition without stuffy smell just after processed, even when it was tasted after preserved at ambient temperature for six months.

EXAMPLE 6

Raw Chocolate

| | |
|---|---|
| Couverture "MANJARI" | 100 parts by weight |
| Framboise puree | 50 parts by weight |
| Fresh cream (35%) | 20 parts by weight |
| Butter | 20 parts by weight |
| "TORIMORIN" (invert sugar) | 10 parts by weight |
| Sugar (granulated sugar) | 10 parts by weight |
| Hydrous crystalline α,α-trehalose (product name "TREHA", commercialized by Hayashibara Shoji Inc.) | 10 parts by weight |

A raw chocolate was produced according to the above Formula in a usual manner. The product has a satisfactory chocolate flavor and puree's taste without stuffy smell because α,α-trehalose in the product inhibits the 2,3-butanedione formation due to heating chocolate (couverture "MANJARI").

EXAMPLE 7

Raw Chocolate

A raw chocolate was produced according to the same method in Example 6 except for using anhydrous crystalline maltitol (product name "MABIT", commercialized by Hayashibara Shoji Inc.) instead of hydrous crystalline α,α-trehalose in the same amount. The product is flavorful without stuffy smell because maltitol in the product inhibits the 2,3-butanedione formation due to heating chocolate (couverture "MANJARI").

EXAMPLE 8

Glagage Chocolat Noir

Formula 1

| | |
|---|---|
| Water | 2,400 parts by weight |
| Hydrous crystalline α,α-trehalose (product name "TREHA", commercialized by Hayashibara Shoji Inc.) | 3,040 parts by weight |
| Syrup containing saccharide derivatives of α,α-trehalose (product name "HALLODEX", commercialized by Hayashibara Shoji Inc.) | 1,200 parts by weight |

Formula 2

| | |
|---|---|
| Pectizing agent (product name "PECTAGEL843", commercialized by Aiko Industries, Inc.) | 12 parts by weight |
| Sugar (granulated sugar) | 176 parts by weight |
| 50% citric acid aqueous solution | 120 drops |

Formula 3

| | |
|---|---|
| Water | 1,200 parts by weight |
| Sugar (granulated sugar) | 1,500 parts by weight |
| Fresh cream (38%) | 1,000 parts by weight |
| Hydrous crystalline α,α-trehalose (product name "TREHA", commercialized by Hayashibara Shoji Inc.) | 25 parts by weight |

Formula 4

| | |
|---|---|
| Cocoa powder | 500 parts by weight |
| Dried gelatin | 94 parts by weight |
| Syrup (water:sugar = 1:1) | 200 parts by weight |

Saccharide aqueous solution of Formula 1 was boiled and admixed with composition prepared according to Formula 2. The resulting mixture was boiled down to Brix 72, and admixed with aqueous citric acid solution to produce Glacage neutre. While, mixture of water, sugar, fresh cream and α,α-trehalose according to Formula 3 was admixed together and boiled. The resulting mixture was admixed with cocoa powder to be boiled down to Brix 64. After stopping heating, the resulting mixture was admixed with rehydrated dried gelatin and syrup, and 1,000 parts by weight of the Glacage neutre to obtain Glagage Chocolat Noir. The product is flavorful without stuffy smell because α,α-trehalose and saccharide derivatives of α,α-trehalose in the product more inhibit the 2,3-butanedione formation due to heating cocoa powder than that of using sugar and enzyme-treated starch syrup. In addition, it has an appropriate sweetness and satisfactory gloss and cryoresistance. In the case of using for cakes, the cakes can be evenly and beautifully make up with keeping the edge of the cakes without dropping through the side of the cakes.

EXAMPLE 9

Chocolate Souffle

Formula 1

| | |
|---|---|
| Albumen | 120 parts by weight |
| Sugar (granulated sugar) | 35 parts by weight |
| Hydrous crystalline α,α-trehalose (product name "TREHA", commercialized by Hayashibara Shoji Inc.) | 15 parts by weight |

Formula 2

| | |
|---|---|
| Yolk | 100 parts by weight |
| Albumen | 33 parts by weight |
| Sugar (granulated sugar) | 50 parts by weight |
| Cacao mass | 33 parts by weight |
| Cocoa powder | 13 parts by weight |

A meringue was produced according to Formula 1. A chocolate souffle was produced by using the meringue and ingredients of Formula 2 in a usual manner. The product has a satisfactory cocoa flavor without stuffy smell because α,α-trehalose in the product inhibits the 2,3-butanedione formation due to heating cacao mass and cocoa powder. It kept the flavorful condition just after baked for a long period because α,α-trehalose inhibited the oxidation and decomposition of oil and fat, the production of hydrogen sulfide derived from heated egg ingredients, and drying.

EXAMPLE 10

Chocolate Souffle

Formula 1

| | |
|---|---|
| Albumen | 120 parts by weight |
| Sugar (granulated sugar) | 35 parts by weight |
| Hydrous crystalline α,α-trehalose (product name "TREHA", commercialized by Hayashibara Shoji Inc.) | 15 parts by weight |

Formula 2

| | |
|---|---|
| Yolk | 100 parts by weight |
| Albumen | 33 parts by weight |
| Sugar (granulated sugar) | 40 parts by weight |
| Syrupy saccharide composition containing saccharide derivatives of α,α-trehalose prepared in the Production Example | 10 parts by weight |
| Cacao mass | 33 parts by weight |
| Cocoa powder | 13 parts by weight |

A meringue was produced according to Formula 1. A chocolate souffle was produced by using the meringue and Formula 2 in a usual manner. A chocolate was produced according to the above Formula in a usual manner. The product has a satisfactory cocoa flavor without stuffy smell because α,α-trehalose in the product inhibits the 2,3-butanedione formation due to heating cacao mass and cocoa powder. It kept the flavorful condition just after baked for a long period because α,α-trehalose inhibited the oxidation and decomposition of oil and fat, the production of hydrogen sulfide derived from heated egg ingredients, and drying.

EXAMPLE 11

Butter Cake

| | |
|---|---|
| Whole egg | 41 parts by weight |
| Sugar (granulated sugar) | 99 parts by weight |
| Wheat flour (medium flour) | 91 parts by weight |
| Fresh cream | 83 parts by weight |
| Cocoa powder | 25 parts by weight |
| Fermented butter | 58 parts by weight |
| Fresh cream | 83 parts by weight |
| Hydrous crystalline α,α-trehalose (product name "TREHA" commercialized by Hayashibara Shoji Inc.) | 25 parts by weight |
| Salt | 1.3 parts by weight |
| Vanilla liquid | 1.7 parts by weight |
| Baking powder | 1.7 parts by weight |

A butter cake was produced according to the above Formula in a usual manner. The above cocoa powder was finally kneaded in the resulting batter. The product is flavorful without stuffy smell because α,α-trehalose in the product inhibits the 2,3-butanedione formation due to heating cocoa powder. In addition, it kept the flavorful condition just after baked in a long period because α,α-trehalose inhibited the oxidation and decomposition of fat and oil, the retrogradation of starch, and drying.

EXAMPLE 12

Butter Cake

A butter cake was produced according to the above Formula in Example 11 in a usual manner, except for using powdery maltitol (product name "MABIT", commercialized by Hayashibara Shoji Inc.) instead of α,α-trehalose in the same amount. The product is flavorful without stuffy smell because maltitol in the product inhibits the 2,3-butanedione formation due to heating cocoa powder. In addition, it kept the flavorful condition just after baked in a long period because maltitol inhibited the oxidation and decomposition of fat and oil, the retrogradation of starch, and drying.

EXAMPLE 13

Butter Cake

A butter cake was produced according to the above Formula in Example 11 in a usual manner, except for using syrupy saccharide composition containing saccharide derivatives of a,o- trehalose (product name "HALLODEX", commercialized by Hayashibara Shoji Inc.) instead of α,α-trehalose in the same amount. The product is flavorful without stuffy smell because saccharide derivatives of α,α-trehalose in the product inhibit the 2,3-butanedione formation due to heating cocoa powder. In addition, it kept the flavorful condition just after baked in a long period because saccharide derivatives of α,α-trehalose inhibited the oxidation and decomposition of fat and oil, the retrogradation of starch, and drying.

EXAMPLE 14

Sponge Cake

| | |
|---|---|
| Whole egg | 500 parts by weight |
| Sugar (granulated sugar) | 210 parts by weight |
| Hydrous crystalline α,α-trehalose (product name "TREHA", commercialized by Hayashibara Shoji Inc.) | 90 parts be weight |
| Wheat flour (weak flour) | 200 parts by weight |
| Corn starch | 50 parts by weight |
| Unsalted butter | 100 parts by weight |
| Cocoa powder | 33 parts by weight |

A sponge cake was produced according to the above Formula in a usual manner. The above cocoa powder was mixed with wheat flour and sifted before used. The product is flavorful without stuffy smell because α,α-trehalose in the product inhibits the 2,3-butanedione formation due to heating cocoa powder. In addition, it kept the flavorful condition just after baked in a long period because α,α-trehalose inhibited the oxidation and decomposition of fat and oil, the retrogradation of starch, and drying.

EXAMPLE 15

Sponge Cake

| | |
|---|---|
| Whole egg | 350 parts by weight |
| Sugar | 120 parts by weight |
| Wheat flour | 185 parts by weight |
| Milk | 80 parts by weight |
| Sweet chocolate | 30 parts by weight |
| Anhydrous crystalline maltitol (product name "MABIT", commercialized by Hayashibara Shoji Inc.) | 40 parts by weight |
| Syrupy saccharide composition containing saccharide derivatives of α,α-trehalose prepared in the Production Example | 30 parts by weight |

A sponge cake was produced according to the above Formula in a usual manner. The above cocoa powder was dissolved in boiled milk before used. The product is a flavorful without stuffy smell because maltitol and saccharide derivatives of α,α-trehalose in the product inhibit the 2,3-butanedione formation due to heating sweet chocolate. In addition, it kept the flavorful condition just after baked in a long period because maltitol and saccharide derivatives of α,α-trehalose inhibited the oxidation and decomposition of fat and oil, the retrogradation of starch, the generation of smell of hydrogen sulfide due to heating egg ingredients and drying.

EXAMPLE 16

Chiffon Cake

Formula 1

| | |
|---|---|
| Albumen | 180 parts by weight |
| Sugar (granulated sugar) | 63 parts by weight |
| Hydrous crystalline α,α-trehalose (product name "TREHA", commercialized by Hayashibara Shoji Inc.) | 27 parts by weight |
| Corn starch | 10 parts by weight |

Formula 2

| | |
|---|---|
| Yolk | 70 parts by weight |
| Salad oil | 60 parts by weight |
| Sugar (granulated sugar) | 10 parts by weight |
| Syrupy saccharide composition containing saccharide derivatives of α,α-trehalose (product name "HALLODEX", commercialized by Hayashibara Shoji Inc.) | 14 parts by weight |
| Wheat flour (weak flour) | 60 parts by weight |
| Warm water (50° C.) | 80 parts by weight |
| Cocoa powder | 30 parts by weight |

A meringue was produced according to Formula 1. A chiffon cake was produced by using the meringue and ingredients of Formula 2 in a usual manner. The product has a satisfactory cocoa flavor without stuffy smell because trehalose and saccharide derivatives of α,α-trehalose in the product inhibit the 2,3-butanedione formation due to heating cocoa powder. It kept the flavorful condition just-after baked for a long period because α,α-trehalose and saccharide derivatives of α,α-trehalose inhibited the oxidation and decomposition of oil and fat, retrogradation of starch, generation of smell of hydrogen sulfide due to heating egg ingredients, and drying.

EXAMPLE 17

Chiffon Cake

Formula 1

| | |
|---|---|
| Albumen | 180 parts by weight |
| Sugar (granulated sugar) | 45 parts by weight |
| Hydrous crystalline α,α-trehalose (product name "TREHA", commercialized by Hayashibara Shoji Inc.) | 20 parts by weight |

Formula 2

| | |
|---|---|
| Yolk | 40 parts by weight |
| Salad oil | 80 parts by weight |
| Sugar (granulated sugar) | 20.5 parts by weight |
| Crystalline maltitol powder containing molasses (product name "MABIT", commercialized by Hayashibara Shoji Inc.) | 2 parts by weight |

-continued

| | |
|---|---|
| Salt | 0.5 part by weight |
| Milk | 55 parts by weight |
| Wheat flour (strong flour) | 26.5 parts by weight |
| Wheat flour (weak flour) | 26.5 parts by weight |
| Warm water (50° C.) | 80 parts by weight |
| Cocoa powder | 30 parts by weight |
| B.P. | 2 parts by weight |
| Brandy | 4 parts by weight |
| Couverture | 55 parts by weight |

A meringue was produced according to Formula 1. A chiffon cake was produced by using the meringue and ingredients of Formula 2 in a usual manner. The product has a satisfactory cocoa flavor without stuffy smell because α,α-trehalose and saccharide derivatives of α,α-trehalose in the product inhibit the 2,3-butanedione formation due to heating cocoa powder and chocolate. It kept the flavorful condition just after baked for a long period because α,α-trehalose and saccharide derivatives of α,α-trehalose inhibited the oxidation and decomposition of oil and fat, the generation of hydrogen sulfide due to heating egg ingredients and drying. Although the product is produced by using chocolate, it is a light and fluffy chiffon cake made up beautifully with a soft batter and fadeless meringue in comparison with one produced by using only sugar as saccharides.

EXAMPLE 18

Steamed Cake

| | |
|---|---|
| Hot cake pre-mix | 200 parts by weight |
| Whole egg | 50 parts by weight |
| Milk | 150 parts by weight |
| Cocoa powder | 15 parts by weight |
| Anhydrous crystalline maltitol (product name "MABIT", Hayashibara Shoji Inc.) | 8.3 parts by weight |

According to the above Formula, a batter was prepared and heated by a range to produce a steamed cake. The product is flavorful without stuffy smell because maltitol in the product inhibits the 2,3-butanedione formation due to heating cocoa.

EXAMPLE 19

Steamed Cake

A batter was prepared according to the Formula in Example 18 except for using syrupy saccharide composition containing saccharide derivatives of α,α-trehalose (product name "HALLODEX", commercialized by Hayashibara Shoji Inc.) instead of anhydrous crystalline maltitol in the same amount and heated by a range to produce a streamed cake. The product is flavorful without stuffy smell because saccharide derivatives of α,α-trehalose in the product inhibit the 2,3-butanedione formation due to heating cocoa.

EXAMPLE 20

Cookie

| | |
|---|---|
| Wheat flour (weak flour) | 140 parts by weight |
| Butter | 90 parts by weight |
| chocolate | 115 parts by weight |
| Granulated sugar | 360 parts by weight |
| Whole egg | 200 parts by weight |
| Almond | 200 parts by weight |
| Anhydrous crystalline maltitol (product name "MABIT", commercialized by Hayashibara Shoji Inc.) | 30 parts by weight |
| Syrupy saccharide composition containing saccharide derivatives of α,α-trehalose (product name "HALLODEX", Hayashibara Shoji Inc.) | 20 parts by weight |

According to the above Formula, a cookie was produced in a usual manner. The product has a satisfactory chocolate flavor without stuffy smell because maltitol and saccharide derivatives of α,α-trehalose in the product inhibit the 2,3-butanedione formation due to heating chocolate. It kept the flavorful condition just after processed without the generation of stuffy smell due to 2,3-butanedione formation, in addition, without absorption of moisture, drying, and oxidation or decomposition of fat and oil, even when it was tasted after preserved at ambient temperature for three months.

EXAMPLE 21

Cookie

| | |
|---|---|
| Wheat flour (weak flour) | 70 parts by weight |
| Unsalted butter | 120 parts by weight |
| Cocoa powder | 60 parts by weight |
| Sugar (powder) | 56 parts by weight |
| Yolk | 10 parts by weight |
| Hydrous crystalline α,α-trehalose (product name "TREHA", commercialized by Hayashibara Shoji Inc.) | 24 parts by weight |

According to the above Formula, a cookie was prepared in a usual manner. The product is flavorful without stuffy smell because α,α-trehalose in the product inhibits the 2,3-butanedione formation due to heating cocoa. It kept the flavorful condition just after processed without the generation of stuffy smell due to the 2,3-butanedione formation, in addition, without the absorption of moisture, drying, and oxidation or decomposition of fat and oil, even when it was tasted after preserved at ambient temperature for three months.

EXAMPLE 22

Cookie

A cookie was produced in a usual manner according to the Formula in Example 21 except for using anhydrous crystalline maltitol (product name "NABIT", commercialized by Hayashibara Shoji Inc.) instead of hydrous crystalline trehalose in the same amount. The product is flavorful without stuffy smell because maltitol in the product inhibits the 2,3-butanedione formation due to heating cocoa powder. It kept the flavorful condition just after baked for a long period because maltitol inhibited the oxidation and decomposition of oil and fat, retrogradation of starch and drying.

EXAMPLE 23

Cookie

A cookie was produced in a usual manner according to the Formula in Example 21 except for using syrupy saccharide composition containing saccharide derivatives of α,α-trehalose (product name "HALLODEX", commercialized by Hayashibara Shoji Inc.) instead of hydrous crystalline α,α-trehalose in the same amount. The product is flavorful without stuffy smell because saccharide derivatives of α,α-trehalose in the product inhibit the 2,3-butanedione formation due to heating cocoa powder. It kept the flavorful condition just after baked for a long period because saccharide derivatives of α,α-trehalose inhibited the oxidation and decomposition of oil and fat, and retrogradation of starch.

EXAMPLE 24

Custard Cream

| | |
|---|---|
| Wheat flour (weak flour) | 7.5 parts by weight |
| Corn starch | 22.5 parts by weight |
| Granulated sugar | 76 parts by weight |
| Cocoa powder | 15 parts by weight |
| Whole egg | 12.5 parts by weight |
| Yolk | 45 parts by weight |
| Milk | 220 parts by weight |
| Margarine | 12.5 parts by weight |
| Hydrous crystalline α,α-trehalose (product name "TREHA", commercialized by Hayashibara Shoji Inc.) | 64 parts by weight |
| Saccharide mixture containing saccharide derivatives of α,α-trehalose (product name "HALLODEX", commercialized by Hayashibara Shoji Inc.) | 20 parts by weight |

According to the above Formula, a custard cream was produced in a usual manner. The product is flavorful without stuffy smell because α,α-trehalose and saccharide derivatives of α,α-trehalose in the product inhibit the 2,3-butanedione formation due to heating cocoa powder and the generation of hydrogen sulfide from egg. It kept the flavorful condition just after processed without syneresis, oxidation or decomposition of fat and oil, and generation of stuffy smell, when it was tasted after cold storage or refrigeration for two months.

EXAMPLE 25

Custard Cream

A custard cream was produced in a usual manner according to the Formula in Example 24 except for using powdery maltitol (product name "MABIT", commercialized by Hayashibara Shoji Inc.) instead of hydrous crystalline α,α-trehalose in the same amount. The product is flavorful without stuffy smell because maltitol and saccharide derivatives of α,α-trehalose in the product inhibit the 2,3-butanedione formation due to heating cocoa powder. It kept the preferable flavor for a long period because maltitol and saccharide derivatives of α,α-trehalose inhibited the oxidation and decomposition of oil and fat, and retrogradation of starch. In addition, it kept the flavorful condition just after processed without syneresis, oxidation or decomposition of fat and oil, and the generation of stuffy smell due to 2,3-butanedione formation, when it was tasted after cold storage or refrigeration for two months.

EXAMPLE 26

Chocolate Drink

| | |
|---|---|
| Milk chocolate | 50 parts by weight |
| Semi-sweet chocolate | 65 parts by weight |
| Fresh cream | 55 parts by weight |
| Milk | 120 parts by weight |
| Hydrous crystalline α,α-trehalose (product name "TREHA", commercialized by Hayashibara Shoji Inc.) | 5 parts by weight |
| Western liquor | An appropriate amount |

According to the above Formula, a hot chocolate drink was produced in a usual manner. The product is flavorful without stuffy smell because α,α-trehalose in the product inhibits the 2,3-butanedione formation due to heating chocolate. It is flavorful and delicious even when chilled.

EXAMPLE 27

Chocolate Drink

A chocolate drink was produced in a usual manner according to the Formula in Example 26 except for using powdery maltitol (product name "MABIT", commercialized by Hayashibara Shoji Inc.) instead of hydrous crystalline α,α-trehalose in the same amount. The product is flavorful without stuffy smell because maltitol in the product inhibits the 2,3-butanedione formation due to heating chocolate.

EXAMPLE 28

Chocolate Drink

A chocolate drink was produced in a usual manner according to the Formula in Example 26 except for using syrupy saccharide composition containing saccharide derivatives of α,α-trehalose prepared in the Production Example instead of hydrous crystalline α,α-trehalose in the same amount. The product is flavorful without stuffy smell because saccharide derivatives of α,α-trehalose in the product inhibit the 2,3-butanedione formation due to heating chocolate.

EXAMPLE 29

Orange Cocoa Drink

| | |
|---|---|
| Cocoa powder | 18 parts by weight |
| Boiling water | 6 parts by weight |
| Orange juice | 120 parts by weight |
| Anhydrous crystalline maltitol (product name "MABIT", commercialized by Hayashibara Shoji Inc.) | 1 part by weight |
| Syrupy saccharide composition containing saccharide derivatives of α,α-trehalose (product name "HALLODEX", commercialized by Hayashibara Shoji Inc.) | 1 part by weight |

According to the above Formula, maltitol and saccharide composition containing saccharide derivatives of α,α-trehalose were dissolved in water with heating and stirring to be boiled. The resulting mixture was admixed with cocoa powder and kneaded well. The resulting mixture was admixed with orange juice with stirring and admixed with a few piece of ice. The product is flavorful without stuffy smell because maltitol and saccharide derivatives of α,α-trehalose in the product inhibit the 2,3-butanedione formation due to admixing cocoa powder with boiling saccharide solution.

INDUSTRIAL APPLICABILITY

As explaining above, the present invention enables to produce flavorful processed cacao bean products during processing or after the preservation because the 2,3-butanedione formation can be effectively inhibited during processing or preserving by incorporating one or more members selected from the group consisting of maltitol, α,α-maltose and saccharide derivatives of α,α-trehalose in processed cacao bean products at any step until the product is finished and/or its final product. Therefore, the present invention can be used in various fields such as cosmetics, quasi-drugs, pharmaceuticals, groceries, commodities and sundries as well as foods and beverages. The present invention with such as outstanding function and effect is a significant invention that will greatly contribute to this art.

The invention claimed is:

1. A method of inhibiting 2,3-butanedione formation, which comprises
    adding an amount sufficient to inhibit 2,3-butanedione formation of a saccharide derivative of α,α-trehalose to a processed product containing a cacao bean and/or ingredient of cacao bean and/or final product thereof in any processing step until the processed product is finally produced.

2. The method of claim 1, wherein said saccharide derivative of α,α-trehalose is incorporated in the processed product in a total amount of 0.1% or more by weight to total weight of cacao bean and/or ingredient of cacao bean in the processed product.

3. The method of claim 1 or 2, wherein said processed product is a food, beverage, pharmaceutical, quasi-drug, cosmetic, grocery, commodity or sundry.

4. The method of claim 3, wherein said food or beverage is selected from the group consisting of chocolate, cocoa, food containing cacao milk, food containing cacao butter, food or beverage containing chocolate, food or beverage containing cocoa.

5. The method of claim 1 or 2, wherein the saccharide derivative of α,α-trehalose has three or more glucose residues in a molecule thereof, as well as an α,α-trehalose structure.

6. The method of claim 5, wherein the saccharide derivative of α,α-trehalose has a glucose polymerization degree of three to six.

7. The method of claim 6, wherein the saccharide derivative of α,α-trehalose is selected from the group consisting of mono-glucosyl α,α-trehaloses, di-glucosyl α,α-trehaloses, tri-glucosyl α,α-trehaloses and tetra-glucosyl α,α-trehaloses.

8. The method of claim 1 or 2, wherein the saccharide derivative of α,α-trehalose is selected from the group consisting of α-glucosyl α,α-trehalose, α-maltosyl α,α-trehalose, α-maltotriosyl α,α-trehalose and α-maltotetraosyl α,α-trehalose.

* * * * *